US006347461B1

United States Patent
Rodriguez et al.

(10) Patent No.: US 6,347,461 B1
(45) Date of Patent: Feb. 19, 2002

(54) PORTABLE DRAFT MEASUREMENT DEVICE AND METHOD OF USE THEREFOR

(75) Inventors: David Ray Rodriguez, Ocean Springs, MS (US); Robert Wallace Peavey, Mobile, AL (US); Wesley Eugene Beech, deceased, late of Pascagoula, MS (US), by Barbara Diane Beech, executrix; Jason Michael Beatty, Pascagoula, MS (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/455,794

(22) Filed: Dec. 7, 1999

(51) Int. Cl.⁷ .................................................. G01B 5/18
(52) U.S. Cl. .......................... 33/717; 33/722; 73/864.63
(58) Field of Search .......................... 33/713, 717, 721, 33/719, 722, 718; 73/864.63, 302, 303, 426, 427, 428, 429

(56) References Cited

U.S. PATENT DOCUMENTS

| | | | | |
|---|---|---|---|---|
| 152,971 A | * | 7/1874 | Conklin ........................ | 33/717 |
| 1,511,591 A | * | 10/1924 | Colligan .................. | 73/864.63 |
| 1,605,821 A | | 11/1926 | Ehrentraut | |
| 2,544,262 A | * | 3/1951 | Hall ............................. | 33/717 |
| 2,634,612 A | * | 4/1953 | Quist ...................... | 73/864.63 |
| 3,199,199 A | * | 8/1965 | Harrell et al. ................. | 33/717 |
| 3,334,608 A | * | 8/1967 | Nemoto et al. ........... | 114/74 R |
| 3,396,470 A | * | 8/1968 | Wood .......................... | 33/717 |
| 4,346,519 A | * | 8/1982 | Milo ........................... | 33/717 |
| 4,649,746 A | * | 3/1987 | Snow ....................... | 73/290 R |

FOREIGN PATENT DOCUMENTS

FR          1189597       * 10/1959 .................. 33/718

OTHER PUBLICATIONS

"Naval Ships' Technical Manual", NAVSEA S9086–C6–STM–000, Chapter 096, p. 9, Feb. 15, 1976.

* cited by examiner

Primary Examiner—Diego Gutierrez
Assistant Examiner—Lydia M. DeJeús
(74) Attorney, Agent, or Firm—Lowe Hauptman Gilman & Berner, LLP

(57) ABSTRACT

A portable draft measurement device for measuring the draft of a vessel including a tube having an upper end, a lower end, and an interior volume between the upper and lower ends. The device includes a valve fixed to the lower end of the tube, and a resiliently biased valve actuator coupled with the valve and accessible through the upper end of the tube for selectively opening and closing the valve. Selectively opening the valve with the lower end of the tube immersed in the water in which the vessel floats, produces a level of water within the interior volume of the tube indicative of a water-line on the vessel. Selectively closing the valve retains the level of water within the interior volume, whereby the device can be removed from the water and transported to a location where the level of fluid can be measured as against a measuring tape observed through the tube.

14 Claims, 7 Drawing Sheets

PORTABLE DRAFT MEASUREMENT DEVICE AND METHOD OF USE THEREFOR

FIELD OF THE INVENTION

The present invention generally relates to draft measurement devices, and more particularly, to a portable draft measurement device capable of retaining a fluid level indicative of a draft of a vessel.

BACKGROUND OF THE INVENTION

Successful navigation of a vessel through a body of water requires the vessel's navigator to know the draft of the vessel. The draft of the vessel is defined as a depth of water displaced by the vessel. The draft can be measured as a vertical distance from a water-line on a hull of the vessel where the hull breaks a surface of the water to a lowest point on a submerged portion of the hull. The draft of the vessel can change depending on the cargo and weight of the vessel. If the vessel is traversing dangerously shallow water the vessel may become grounded and perhaps catastrophically could become damaged, threatening the lives of the crewman and in the case of the Exxon Valdez, causing environmental problems. Accurate predictions for the vessel's drafts are based upon draft readings taken at the time of the vessel's certification inclining experiment, performed for compliance with regulatory agencies, such as the U.S. Coast Guard.

One known method of measuring the draft uses a measuring tape. The user extends the tape from the deck of the vessel into the water. The draft is determined by subtracting 1) the measured distance from the deck to the waterline from 2) the deck to the lowest point of the hull. Disadvantageously, using the measuring tape, the user leans over a side of the hull to see where the tape breaks the surface of the water.

This method is disadvantageous for several additional reasons. First, wave action at the surface of the water can make observation of the water-line difficult. Second, careful visual observation of the measurement indicia while leaning over the hull side is at least inconvenient, and can be dangerous when strong wave action causes the hull to rock to-and-fro. Third, strong underwater currents can cause movement and flexing of an immersed portion of the measuring tape, reducing the accuracy of any measurements taken.

A fluid level gauge for measuring the level of a fluid in a container tank is disclosed in U.S. Pat. No. 1,605,821. The gauge includes a vertical cylindrical shell and a buoyant fluid level indicator that rises and falls with a level of the fluid within the shell. An elongate lever 11 coupled to a top end of the shell and extending radially away from the shell, when rotated, fixes the indicator 7 in place so as to indicate a fluid level at the time the lever is rotated. This gauge suffers at least the following disadvantages as applied to draft determination. First, the gauge is not suited to an environment in which the fluid level experiences substantial fluctuations because the gauge fails to provide baffle structures to dampen fluid level fluctuations. Second, the gauge is not portable.

Accordingly, there is a need to accurately determine the draft of a vessel with a portable and durable device. There is a further need to accurately determine the draft of a vessel in the presence of wave action at the surface of the water and underwater turbulence. There is a further need to reduce the dangers and difficulties associated with carefully observing and measuring the vertical location of a water-line and the draft of a vessel, respectively.

SUMMARY OF THE INVENTION

An object of the present invention is to provide a portable and durable draft measurement device for accurately measuring the draft of a vessel.

Another object of the present invention is to provide a device for measuring the draft of a vessel, wherein an individual can carefully, safely and conveniently observe a water-line to determine the draft while the device is completely removed from the water in which the vessel is floating.

Another object of the present invention is to provide a device for measuring the draft of a vessel, wherein an observable level of water used to determine the draft is created by the device when the device is immersed in the water in which the vessel is floating, and then retained by the device when the device is removed from the water.

Another object of the present invention is to decrease the difficulty of taking draft measurements and increase the accuracy of draft measurements as compared to prior art devices by dampening fluctuations in an observable level of water used to determine the draft, the fluctuations arising from wave action, fluid surges due to hydrostatic pressure and underwater currents.

Another object of the present invention is to reduce alignment errors between a device for measuring the draft of a vessel and the draft of the vessel.

These and other objects of the present invention are provided by a device for measuring the draft of a vessel floating in a body of water. The device includes a durable, elongate, substantially transparent tube having an upper end, a lower end, and an interior volume between the upper and lower ends. The device advantageously includes a valve fixed to the lower end of the tube, and a resiliently biased valve actuator coupled with the valve and accessible through the upper end of the tube for selectively opening and closing the valve. Selectively opening the valve with the lower end of the tube immersed in the water in which the vessel floats, creates a level of water within the interior volume of the tube indicative of a water-line on the vessel. Selectively closing the valve preserves or retains the level of water within the interior volume, whereby the device can be removed from the water and transported to a location where the level of fluid can be conveniently, safely, and accurately observed as against a measuring tape observed through the tube. The device includes a resilient member to bias the actuator into a position corresponding to the closed position of the valve, and a resiliently biased lock to hold the actuator in a position corresponding to the open position of the valve. Such conveniences increase the ease with which an individual using the device can take draft measurements. The device includes interior and exterior fluidic baffles fixed proximate the valve which advantageously dampen fluctuations in the level of fluid within the interior volume when the valve is open. Also, an alignment spacer, and/or bubble levels fixed to an external portion of the tube, advantageously orient the tube parallel with the draft of the vessel.

The foregoing objects are also achieved by a portable draft measurement device that includes a tube having an upper end, a lower end, an interior volume, and indicia to indicate a level of fluid retained within the interior volume. The device also includes a valve fixed to the lower end of the tube. The valve has an open position placing the interior volume into fluid communication with a fluid when the lower end is immersed in the fluid to create the level of fluid within the interior volume. The valve has a watertight, closed position to thereby retain the level of fluid within the interior volume. The device also includes an actuator coupled to the upper end of the tube for placing the valve into the open and closed positions. The actuator includes a first resilient member biasing the actuator into a first position corresponding to the closed position of the valve. The actuator is displaceable from the first position to a second position against a bias of the first resilient member to place the valve into the open position.

The foregoing objects are also achieved by a method of measuring a draft of a vessel with the draft measurement device. The method includes immersing the lower end of the tube in a fluid and aligning the upper end of the tube with a calibration mark on the vessel indicative of a known draft. A level of fluid is created and retained within the interior volume of the tube. The draft of the vessel is determined using the level of fluid retained within the interior volume.

Still other objects and advantages of the present invention will become readily apparent to those skilled in the art from the following detailed description, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein.

BEST MODE FOR CARRYING OUT THE INVENTION

Figure 1:
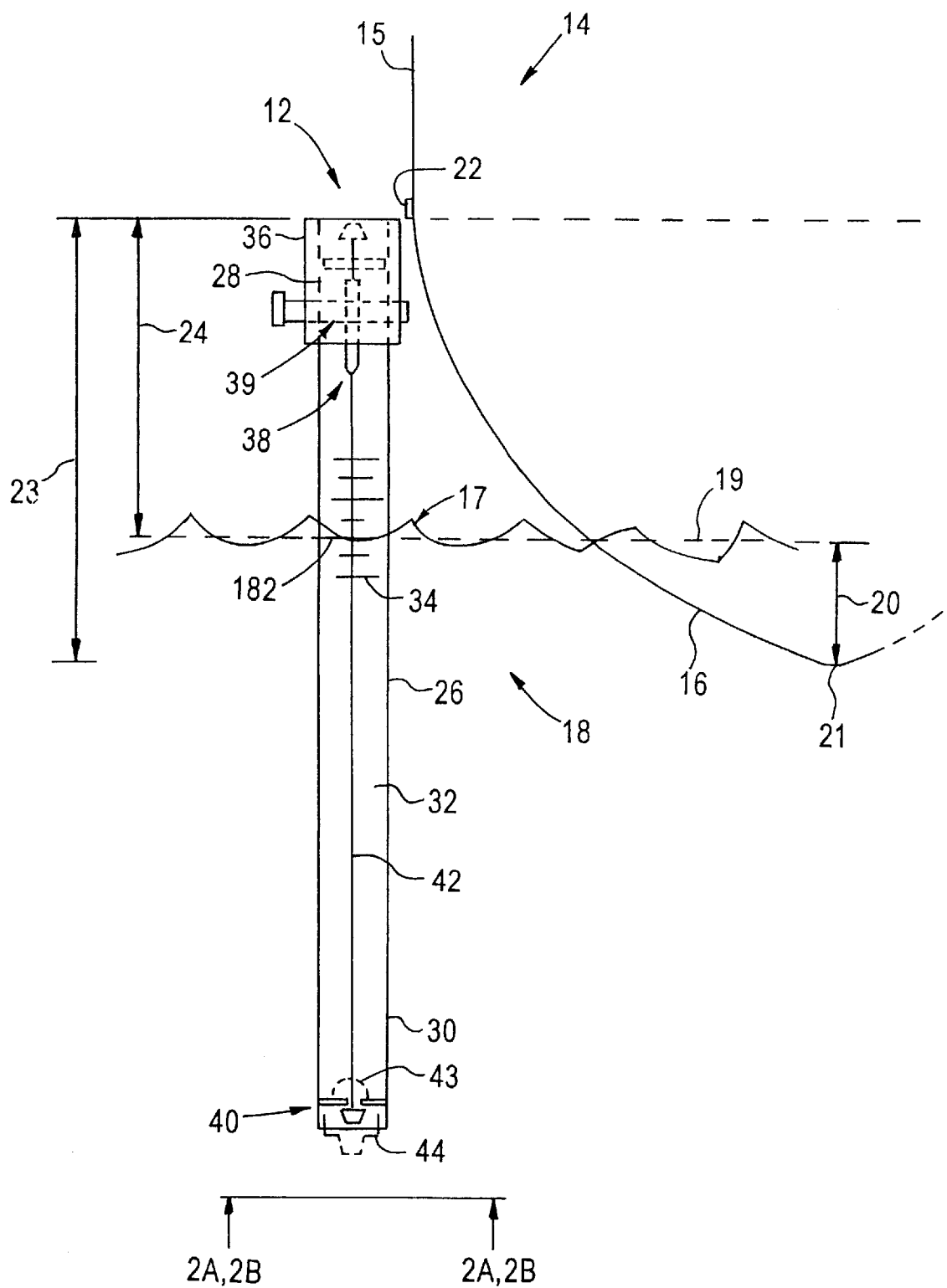
FIG. 1 is a side elevational view of a draft measurement device in accordance with the present invention used to measure the draft of a vessel.

With reference to FIG. 1, a portable draft measurement device 12 constructed in accordance with the principles of the present invention, is depicted. For convenience, terms such as "above", "below", "right" and "left", as used herein, are to be construed in the relative sense. The portable draft measurement device 12 is depicted in a vertical operative position in FIG. 1. A vessel 14, such as a ship, boat or the like, includes a hull 15 having a lower hull portion 16 below a surface 17 of a body of water 18. A water line depicted at 19 represents an average level of the water surface 17 against hull 15.

Draft 20 is the vertical distance between water line 19 and a lowest point 21 of hull 15 immersed in water 18. A calibrated marker or draft mark 22 on an exterior surface of hull 15 represents a known vertical height 23 of hull 15. As will be described in detail below, a user measures a vertical distance 24 between calibrated marker 22 and water line 19, using the portable draft measurement device 12, and from this measurement, draft 20 can be determined. Specifically, draft 20 of vessel 14 is determined by subtracting 1) distance 24 measured using the draft measurement device 12 from 2) the known vertical height 23.

Portable draft-measurement device 12 includes an elongate, cylindrically-shaped tube 26 having a wall made from a substantially transparent, durable material, such as polycarbonate plastic. A longitudinal axis of tube 26 extends in a vertical direction. Tube 26 includes an upper end 28 vertically spaced from a lower end 30 of tube 26. The lower end 30 extends through and below surface 17 of body of water 18, as depicted in FIG. 1. However, it should be appreciated that lower end 30 is removed from body of water 18 to take draft measurements, as will be described later. An interior volume 32 within tube 26 is defined between upper and lower ends 28,30 and an interior surface of a wall of tube 26. Draft measurement device 12 also includes measurement indicia 34 or a series of vertically spaced graduations 34. Graduations 34 and interior volume 32 are visible through the substantially transparent wall of tube 26. It should be appreciated that tube 26 of portable draft measurement device 12 need not have a vertical length in excess of vertical height 23 because distance 24, measured by device 12, will always be less than vertical height 23.

A substantially cylindrical upper housing 36 is concentric to and partially surrounds and protects upper end 28 of tube 26. Upper housing 36 has an inner surface fixed to an outer surface or wall 37 (see FIG. 2A) of upper end 28 of tube 26. As will be fully described later, the draft measurement device 12 includes a valve actuator assembly 38, and a lock mechanism 39 (depicted by dotted lines in FIG. 1). A fluid inlet valve 40 positioned within lower end 30 of tube 26, is depicted in an open position in FIG. 1. The valve actuator assembly 38 includes an actuator rod 42 coaxial with tube 26 and extending within interior volume 32 between upper and lower ends 28, 30. Actuator rod 42 is coupled to and between valve 40 and upper end 28 of tube 26. All materials of construction of the draft measurement device 12 should be made from durable, non-corrosive materials so as to not corrode in a salt water environment.

The valve actuator assembly advantageously permits a user of the draft measurement device 12 to selectively open and close valve 40, as will later be described in detail. When lower end 30 is immersed in water 18, the opening of valve 40 with actuator rod 42 places interior volume 32 in fluid communication with fluid 18, whereby hydrostatic pressure within fluid 18 causes fluid to at least partially fill interior volume 32, thus producing or creating a level of fluid within interior volume 32. Advantageously, using lock mechanism 39, the user can selectively lock actuator rod 42 into a position corresponding to the open position of valve 40.

Closing valve 40 with actuator rod 42 advantageously retains the fluid, and thus the level of fluid, within interior volume 32. The user measures the vertical distance 24 by observing the level of fluid retained within interior volume 32 as against measurement indicia 34.

Draft measurement device 12 advantageously includes an interior-baffle 43 and an opposing exterior-baffle 44, both positioned near valve 40. Interior-baffle 43 is positioned within interior volume 32 while exterior-baffle 44 is positioned exterior to interior volume 32. With valve 40 open, baffles 43,44 cooperate to substantially impede fluid flow proximate valve 40, to thus regulate the flow of fluid into and out of interior volume 32 and to dampen fluctuations of the level of fluid within the interior volume. Overall, such fluid regulation maintains a relatively stable or steady level of fluid within interior volume 32.

Valve Actuator Assemble

An arrangement of the valve actuator assembly of the present invention, designated generally by reference numeral 38, used to open and close valve 40 is now described in detail with reference to FIGS. 2A, 2B and the exploded view of FIG. 3.

Figure 2A:
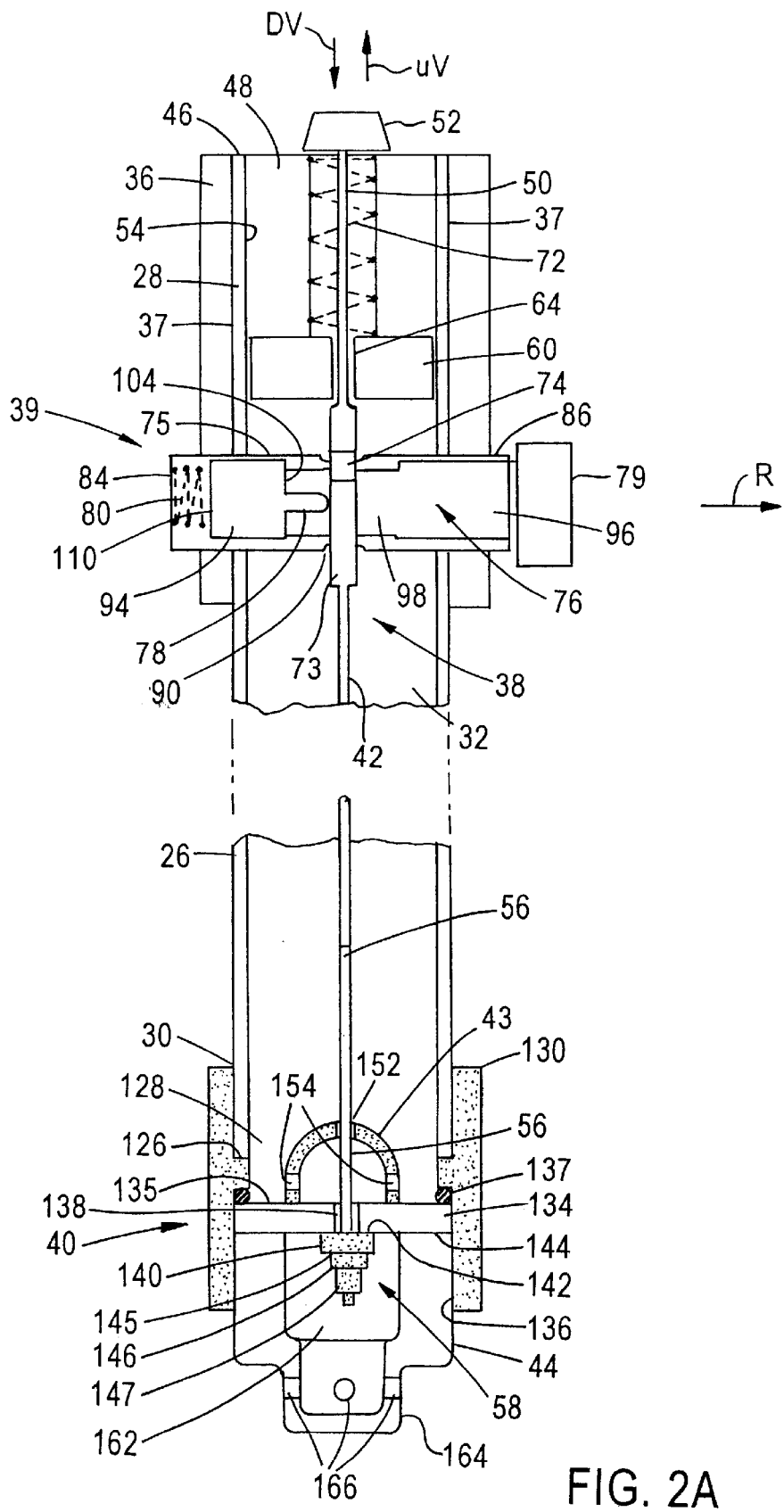
FIG. 2A is a partial cross-sectional view of the draft measurement device of FIG. 1, with an actuator rod of the device in a first position and a valve of the device in a corresponding closed position.

As depicted in FIG. 2A, valve actuator assembly 38 includes actuator rod 42, a plunger 52 fixed to a threaded upper end 50 of actuator rod 42, an actuator rod upper-guide 60 fixed within upper end 28 of tube 26, and a resilient member 72 held in compression between actuator rod upper-guide 60 and plunger 52. A threaded lower end 56 of actuator rod 42 is coupled with valve 40, depicted in the closed position in FIG. 2A. In operation, the user of the portable draft measurement device 12 opens valve 40 with valve actuator assembly 38 by depressing plunger 52, accessible to the user at upper end 28 of tube 26, in the downward vertical direction indicated by arrow DV against a biasing force of resilient member 72. Such depression of plunger 52 vertically displaces actuator rod 42 from a first position corresponding to a closed position of valve 40, to a second position corresponding to an open position of valve 40 (depicted in FIG. 2B). As will later be described in detail, lock mechanism 39, positioned at upper end 28 of tube 26, automatically locks actuator rod 42 into the second position corresponding to the open position of valve 40. Lock mechanism 39 thus advantageously relieves the user of the burden of having to hold actuator rod 42 in the second position.

The structure of actuator assembly 38 is now described in greater detail with reference to FIG. 2A. Upper end 28 of tube 26 terminates in a circumferential edge 46 defining an opening 48 in communication with interior volume 32 of tube 26. Threaded upper end 50 of actuator rod 42 extends through and above a central portion of opening 48. Plunger 52 threadingly engages threaded upper end 50 of actuator rod 42. Plunger 52 has a smaller diameter than a diameter of opening 48, and less than an inner diameter of upper end 28 defined by a cylindrically-shaped inner surface 54 of tube 26. Threaded lower end 56 of actuator rod 42, positioned within lower end 30 of tube 26, threadingly engages a valve plug 58 of valve 40. Actuator rod 42 also includes an actuator rod shuttle 73 extending through lock mechanism 39. Actuator rod shuttle 73 has an elongate, vertically directed, parallelepipedly-shaped body. The parallelepiped body of rod shuttle 73 includes a transverse through-aperture or recess 74 for engaging lock mechanism 39, as will be described in detail below.

Valve actuator assembly 38 includes cylindrically-shaped, actuator rod upper-guide 60 fixed within upper end 28 of tube 26 and proximate opening 48. Upper-guide 60 limits movement of actuator rod 42 in a direction perpendicular (i.e., transverse) to the vertical direction and the axis of tube 26, while freely permitting vertical displacement of actuator rod 42. Cylindrically-shaped upper guide 60 includes a pair of opposing ends intersecting a transverse axis 62 of upper guide 60. The pair of opposing ends are fixed to respective opposing portions of inner surface 54 of tube 26. Upper-guide 60 includes a central through-aperture 64 coaxial with tube 26. Through-aperture 64 includes an inner diameter slightly larger than an outer diameter of a length of actuator rod 42 extending vertically through through-aperture 64.

Figure 3:
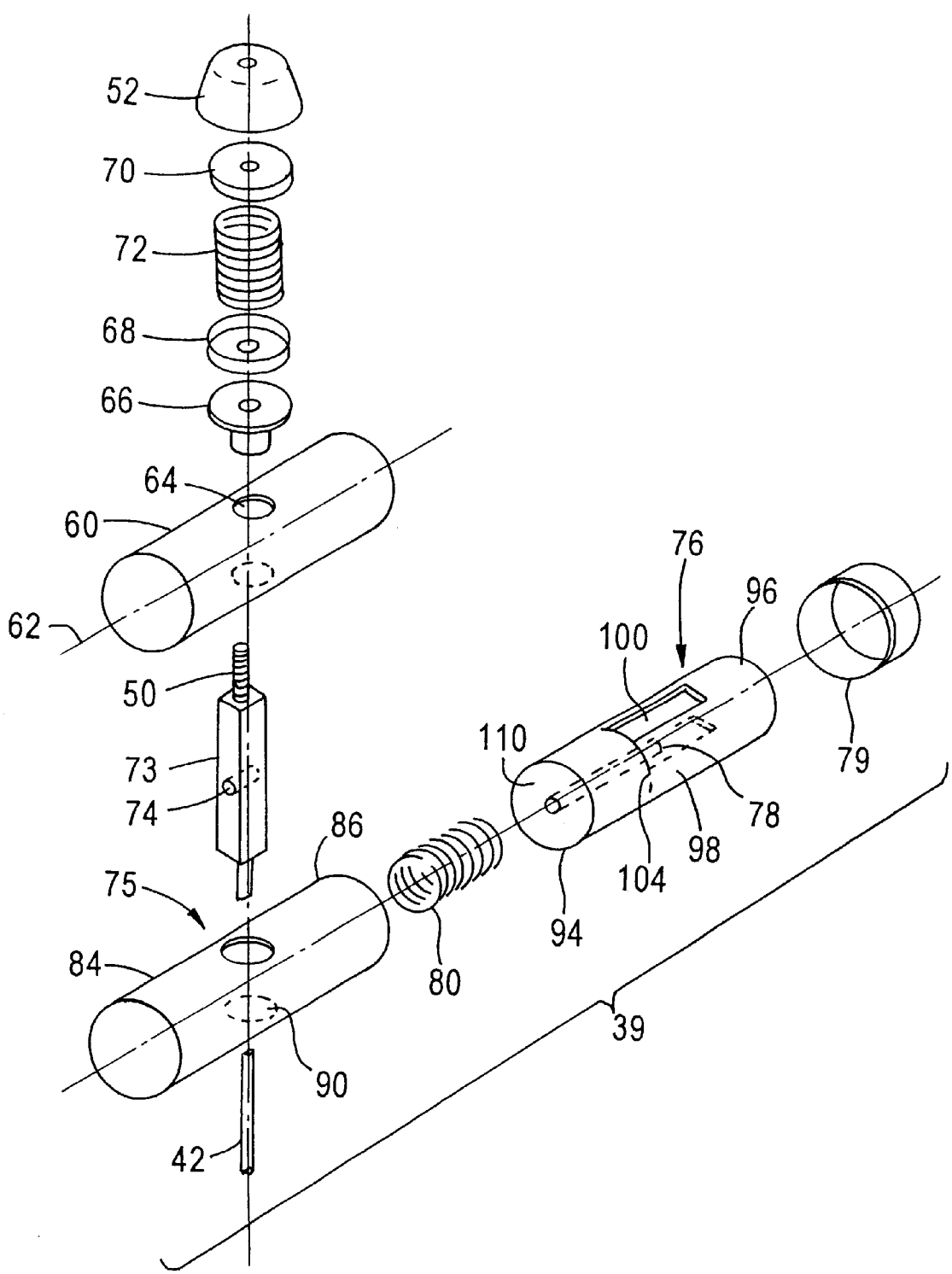
FIG. 3 is an exploded perspective view of an actuator assembly and a lock mechanism of the draft measurement device of FIG. 1.

As depicted in the exploded view of FIG. 3, valve actuator assembly 38 further includes a bushing 66 received within through-aperture 64 and supported by an upper surface of upper guide 60. Valve actuator assembly 38 includes a lower spring retainer 68 supported by an upper surface of bushing 66, and an opposing or upper spring retainer 70 abutting a lower surface of plunger 52. Bushing 66 and spring retainers 68, 70 each include a central through-aperture coaxial with tube 26, with threaded upper end 50 of actuator rod 42 extending through each of these through-apertures.

Valve actuator assembly 38 also includes resilient member 72, such as a coiled compression spring 72, compressively retained between lower and upper spring retainers 68,70 and thus between the upper surface of fixed upper-guide 60 and plunger 52. Threaded upper end 50 of actuator rod 42 extends through the coiled body of spring 72. Advantageously, spring 72 biases actuator rod 42 into the first position corresponding to the closed position of valve 40 (FIG. 2A) to thus retain fluidic contents within interior volume 32 as mentioned above.

Lock Mechanism

As mentioned above, draft measurement device 12 also includes lock mechanism 39, retained substantially within tube 26 and upper housing 36, for selectively locking actuator rod 42 into the second position corresponding to the open position of valve 40 as will be fully described. Lock mechanism 39 includes a transverse lock housing 75 fixed at upper end 28 of tube 26, a slotted, transversely displaceable locking-pin carriage 76 positioned partially within lock housing 75, a transverse locking-pin 78 carried by locking-pin carriage 76, an end cap 79, and a resilient member 80 retained between lock housing 75 and locking pin carriage 76.

Figure 2B:
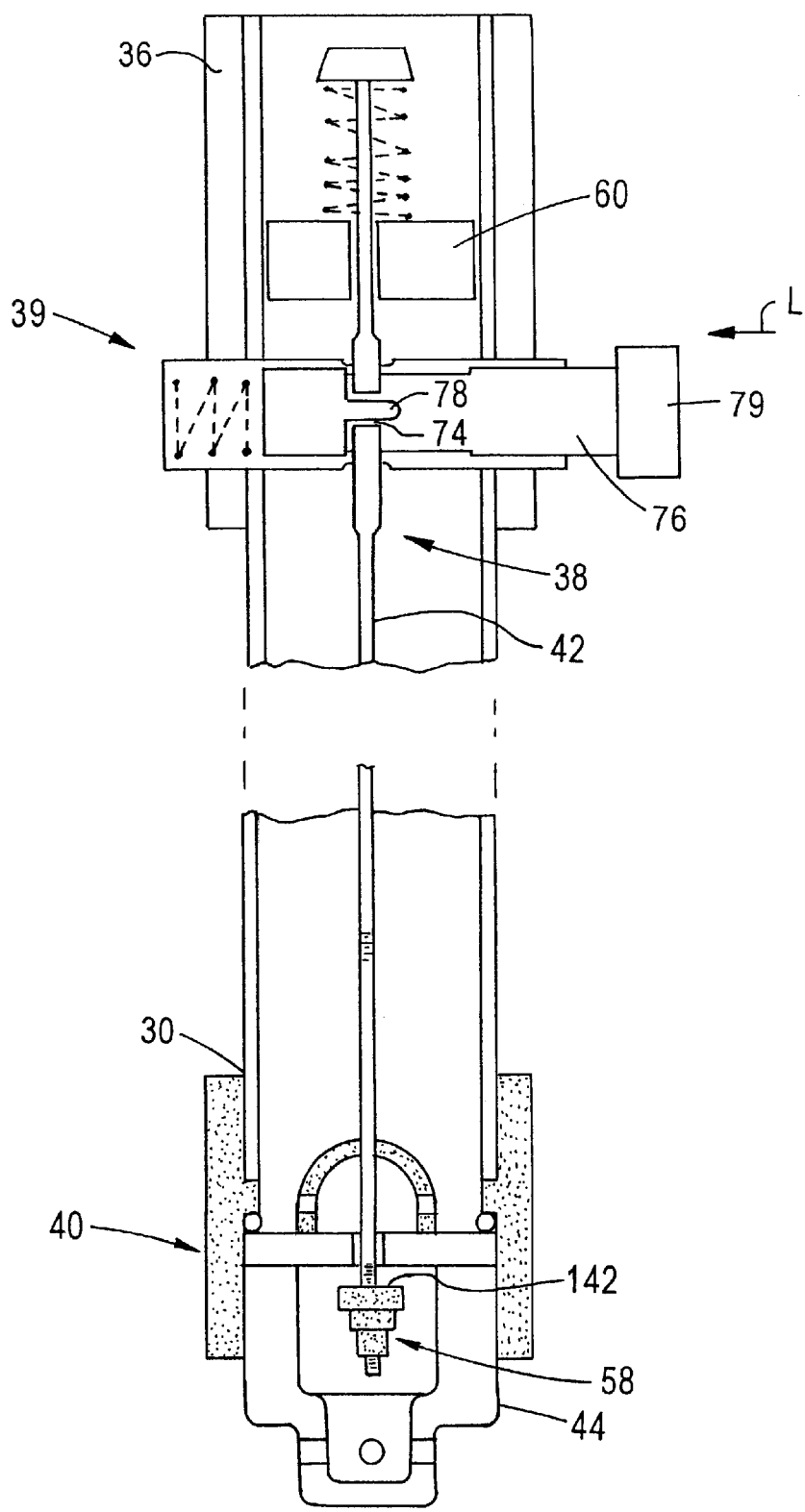
FIG. 2B is a partial cross-sectional view of the draft measurement device of FIG. 1, with the valve actuator in a second position and the valve in a corresponding open position.

In operation, resilient member 80 biases locking-pin 78 into engagement with recess 74 of actuator rod 42 to lock actuator rod 42 into the second position depicted in FIG. 2B. The user disengages locking-pin 78 from actuator rod 42 by depressing end cap 79 in a transverse direction indicated by a left-pointing arrow L in FIG. 2B. With locking pin 78 disengaged, resilient member 72 of actuator assembly 38 forces actuator 42 in an upward vertical direction indicated by an arrow UV to thus close valve 40.

The structure of the lock mechanism 39 is now described in detail still with reference to FIGS. 2A, 2B and 3. Cylindrical lock housing 75 has a hollow interior extending transversely across upper end 28 of tube 26. Lock housing 75 extends through opposing sides of tube 26 and upper housing 36. A first end 84 and an opposing second end 86 of lock housing 75 respectively extend transversely through opposing through-apertures in tube 26 and upper housing 36. Lock housing 75 includes a central through-aperture 90 coaxial with tube 26 and aligned to receive a vertical portion of actuator rod 42.

Locking-pin carriage 76 is substantially cylindrically-shaped and sized for insertion into the hollow interior of lock housing 75. Locking-pin carriage 76 includes an interior end 94 (a left-end) within the hollow interior of lock housing 75, an exterior end 96 (a right-end) exterior to lock housing 75 and upper housing 36, and a slotted central portion 98 between interior and exterior ends 94,96, and positioned within interior volume 32 of tube 26. Slotted central portion 98 includes a central, rectangularly-shaped, through-aperture or slot 100 having a transverse length. Slot 100 extends vertically through locking-pin carriage 76, and provides transverse clearance for displacement of locking-pin carriage 76 within lock housing 75 and relative to actuator rod 42. Locking-pin 78 integral with interior end 94 extends from an inner surface 104 of interior end 94 in a transverse direction into slot 100. Locking-pin 78 terminates approximately half-way along the transverse length of slot 100. Recess 74 of actuator rod shuttle 73 is sized to receive locking-pin 78.

End cap 79 is fixed to an exterior surface of exterior end 96 of locking-pin carriage 76. Resilient member 80 is compressively retained within lock housing 75, between first end 84 of lock housing 75 and an outer surface 110 (parallel to inner surface 104) of interior end 94 of locking-pin carriage 76. Spring 80 exerts a biasing force on locking-pin carriage 76 in a transverse direction indicated by right-pointing arrow R.

Valve

As mentioned above, valve actuator assembly 38 advantageously opens and closes valve 40 coupled with lower end 30 of tube 26. Valve 40 is depicted in detail in FIGS. 2A and 2B, and in the exploded view of FIG. 4. Valve 40 includes a valve housing 130 fixed to lower end 30 of tube 26, a valve plate 134 having a through-aperture 138, vertically displaceable valve plug 58, and an o-ring 137. In operation, placing actuator rod 42 in the second position vertically separates valve plug 58 and valve plate 134 (as depicted in FIG. 2B) to open valve 40. On the other hand, placing actuator rod 42 in the first position brings plug 58 into engagement with valve plate 134 to thus seal closed valve 40 (as depicted in FIG. 2A).

The structure of valve 40 is now described in detail. Lower end 30 of tube 26 terminates in a circumferential edge 126 defining an opening 128. Cylindrical valve housing 130 partially surrounds and protects lower end 30 and circumferential edge 126. Valve housing 130 includes an upper inner surface fixed to outer surface or wall 37 of tube 26. Valve housing 130 extends vertically beyond opening 128 thus defining an extended opening of tube 26.

Disc-shaped valve plate 134 extends transversely across the extended opening formed by valve housing 130. A circumferential side of valve plate 134 is fixed to a lower, vertical inner surface 136 of valve housing 130 to form a water tight seal between the valve housing and valve plate 134. An upper surface 135 of valve plate 134 faces interior volume 32. Rubber o-ring 137, retained between an outer peripheral edge of valve plate upper surface 135 and an indented portion of valve housing lower inner surface 136, ensures a water-tight seal between valve plate 134 and valve housing 130. Valve plate 134 includes central through-aperture 138 coaxial with tube 26, with threaded lower end 56 of actuator rod 42 extending vertically and centrally through through-aperture 138.

Valve 40 also includes valve plug 58 fixed to threaded lower end 56 of actuator rod 42. Valve plug 58 includes valve closure washer 140 threadingly engaging threaded lower end 56 of actuator rod 42. Closure washer 140 includes a sealing upper-surface 142 (best seen in FIG. 2B) having an outer diameter greater than a diameter of valve plate through-aperture 138, whereby when sealing upper-surface 142 of valve closure washer 140 engages a lower surface 144 of valve plate 134, valve plate through-aperture 138 is completely obscured or sealed shut. Valve plug 58 also includes a back-up washer 145, a retaining nut 146, and a nut retainer 147 threadingly engaging lower end 56 of actuator rod 42.

Interior and Exterior Baffles

Still with reference to FIG. 2A, draft measurement device 12 includes cylindrically-shaped, interior-baffle 43 within interior volume 32 and proximate valve plate through-aperture 138. Interior-baffle 43 includes a cylindrically-shaped vertical sidewall surrounding an upper portion of valve plate through-aperture 138. The sidewall includes a lower peripheral surface fixed to upper surface 135 of valve plate 134. The sidewall also includes at least one pair of opposing, transverse through-apertures or fluid inlets 154 in fluid communication with interior volume 32 and valve plate through-aperture 138. The through-apertures 154 have a small diameter relative to the inside diameter of tube 26. With lower end 30 immersed in fluid 18 and valve 40 in the open position, interior-baffle 43 dampens forceful surging of fluid 18 into interior volume 32 caused by hydrostatic pressure within fluid 18 surrounding lower end 30, to stabilize the level of fluid within interior volume 32.

Interior-baffle 43 also includes a transverse top-wall having a central through-aperture 152 coaxial with tube 26. Through-aperture 152 has an inner diameter slightly larger than an outer diameter of threaded lower end 56 of actuator rod 42 extending through though-aperture 152. Similar to through-aperture 64 of upper-guide 60, through-aperture 152 of interior-baffle 43 limits a displacement of actuator rod 42 in a transverse direction while freely permitting vertical displacement of actuator rod 42.

Draft measurement device 12 includes exterior-baffle 44 positioned within the extended opening formed below valve plate 134 by valve housing 130. Exterior-baffle 44 also limits surging of fluid into interior volume 32 in part by dampening fluidic turbulence proximate valve 40 caused by sub-surface currents and wave-action (depicted in FIG. 1 at surface 17 of body of fluid 18). Together, interior- and exterior-baffles 43,44 substantially dampen the fluctuations of the fluid level created within interior volume 32, thus stabilizing the fluid level to permit accurate and straight forward visual observations of the fluid level as against measurement indicia 34.

Exterior-baffle 44 includes a cylindrically-shaped, vertical, upper-sidewall fixed to inner-surface 136 of valve housing 130. Also, a peripheral upper edge of the upper-sidewall of exterior-baffle 44 is fixed to an outer peripheral portion of valve plate lower surface 144. A parallelepipedly-shaped inner void 162, defined by the upper-sidewall of exterior-baffle 44, surrounding valve plug 58 provides clearance for vertical displacement of valve plug 58 within the inner void. An vertically-extended lower-sidewall 164 of exterior-baffle 44, having a reduced diameter as compared with the upper-sidewall of exterior-baffle 44, includes a plurality, such as four, transverse through-apertures 166 in fluid communication with valve plate through-aperture 138. The through-apertures 166 have a small diameter relative to the inside diameter of tube 26. The upper-sidewall and lower-sidewall 164 of exterior-baffle 44 advantageously surround and protect valve 40 and valve plug 58.

Detailed Operation

The operation of valve actuator assembly 38, locking mechanism 35 and valve 40 is now described in detail. With actuator rod 42 in the first position and valve 40 correspondingly closed, as depicted in FIG. 2A, spring 80 biases locking-pin 78 against actuator rod shuttle 73. However, shuttle through-aperture 74 and locking-pin 78 are vertically offset and thus disengaged from each other due to the vertical position of shuttle through-aperture 74. With locking-pin 78 disengaged, actuator rod 42 can be vertically displaced. Since spring 72 is compressively retained between the upper surface of fixed upper-guide 60 and plunger 52, spring 72 exerts a force on plunger 52 in the upward vertical direction indicated by arrow UV to thus maintain actuator rod 42 in the first position, and correspondingly, valve 40 in the closed position to retain fluidic contents within interior volume 32 and to prevent fluid from flowing into the interior volume.

With reference to both FIGS. 2A and 2B, and with actuator assembly 38 initially in the first position as just described (FIG. 2A), a vertical depression of plunger 52 and actuator rod 42 in the direction indicated by arrow DV brings locking-pin 78 into transverse alignment with shuttle through-aperture 74, whereby spring 80 biases the locking-pin to move (via locking-pin carriage 76) in the transverse direction R and into engagement with the shuttle through-aperture (FIG. 2B). Such engagement locks actuator rod 42 into the second position (FIG. 2B), and correspondingly, valve 40 into the open position to place interior volume 32 into fluid communication with fluid 18. With reference to FIGS. 1 and 2B, exterior-baffle through-apertures 166, inner void 162, valve plate through-aperture 138, interior-baffle through-apertures 154 and interior volume 32 are in fluid communication with each other and with fluid 18 when lower end 30 is immersed in the fluid with actuator rod 42 in the second position. Fluid filling interior volume 32 displaces air from interior volume 32 through opening 48 at upper end 28 of tube 26.

With valve 40 in the open position as just described, depressing end cap 79 of lock mechanism 39 in a transverse direction indicated by left-pointing arrow L, automatically closes the valve. Such depression disengages locking-pin 78 from shuttle through-aperture 74 and frees actuator rod 42 for vertical displacement, whereby the bias force of spring 72 drives actuator rod 42 upwardly into the first position to close valve 40. Sealing upper-surface 142 of valve closure washer 140 engages valve plate lower surface 144 to form a water-tight seal with lower surface 144, to retain fluid within interior volume 32 of tube 26. In this manner, a fluid level created within interior volume 32 when valve 40 is open, is retained when valve 40 is closed.

Measurement Indicia

Figure 4:
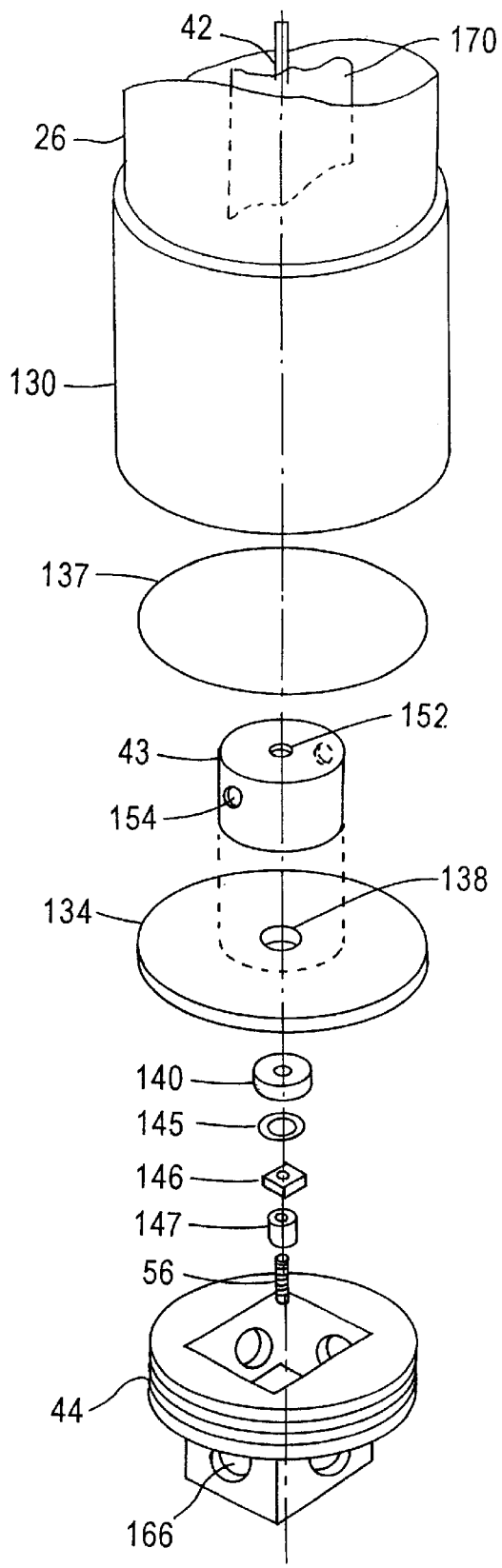
FIG. 4 is an exploded perspective view of the valve of FIGS. 2A and 2B, and a tape retainer of the draft measurement device of FIG. 1.
Figure 5:
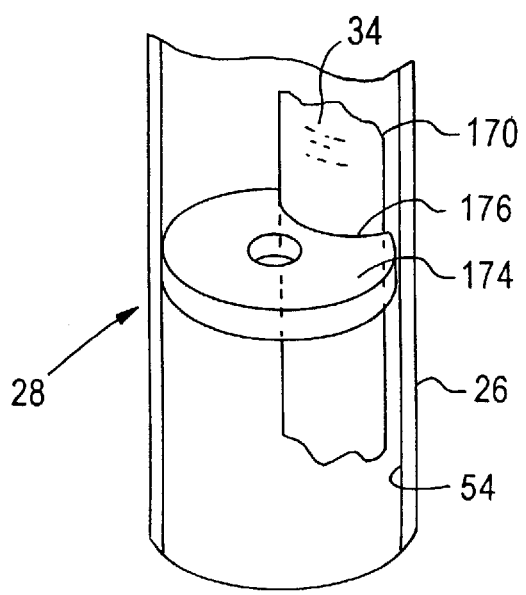
FIG. 5 is a perspective view of a tape guide of the draft measurement device of FIG. 1.

With reference to FIGS. 4 and 5, device 12 includes a measuring tape 170 within interior volume 32 and extending along the vertical length of tube 26. Measuring tape 170 includes an indicia bearing surface for carrying indicia 34, depicted in FIG. 1. It is to be understood that any other suitable indicia bearing medium can be used instead of measuring tape 170. For example, indicia 34 can be inscribed on the wall of tube 26. Indicia 34 represent distance graduations in either imperial or metric units, as required.

With reference to FIG. 5, an upper end of measuring tape 170 is fixed within upper end 28 of tube 26 by a tape guide 174 having an outer peripheral side-portion press-fit against inner surface 54 of tube 26. The outer peripheral side-portion of tape guide 174 includes a bevel 176 for engaging a surface of measuring tape 170 to hold the measuring tape against inner surface 54 of tube 26. Tape guide 174 also includes a central through-aperture coaxial with tube 26 through which extends a vertical length of actuator rod 42.

The indicia bearing surface of Measuring tape 170 faces inner surface 54 of substantially transparent tube 26 thus permitting visual observation of the measurement indicia from a position outside or exterior of tube 26. The orientation of the series of graduations 32 indicative of length or distance, indicates distance 24 (see FIG. 1) between a top-end defined by circumferential edge 46 of upper end 28 of tube 26, and a level of fluid or water level 182 retained within interior volume 32 of tube 26. More specifically, the graduations indicate a distance beginning with zero at the top-end of tube 26, and linearly increasing in a direction toward lower end 30 of the tube. Measurement indicia 34 preferably include graduations in approximately quarter-inch increments if imperial units are used, and centimeter/millimeter units if metric units are used.

Alignment Devices

Figure 6:
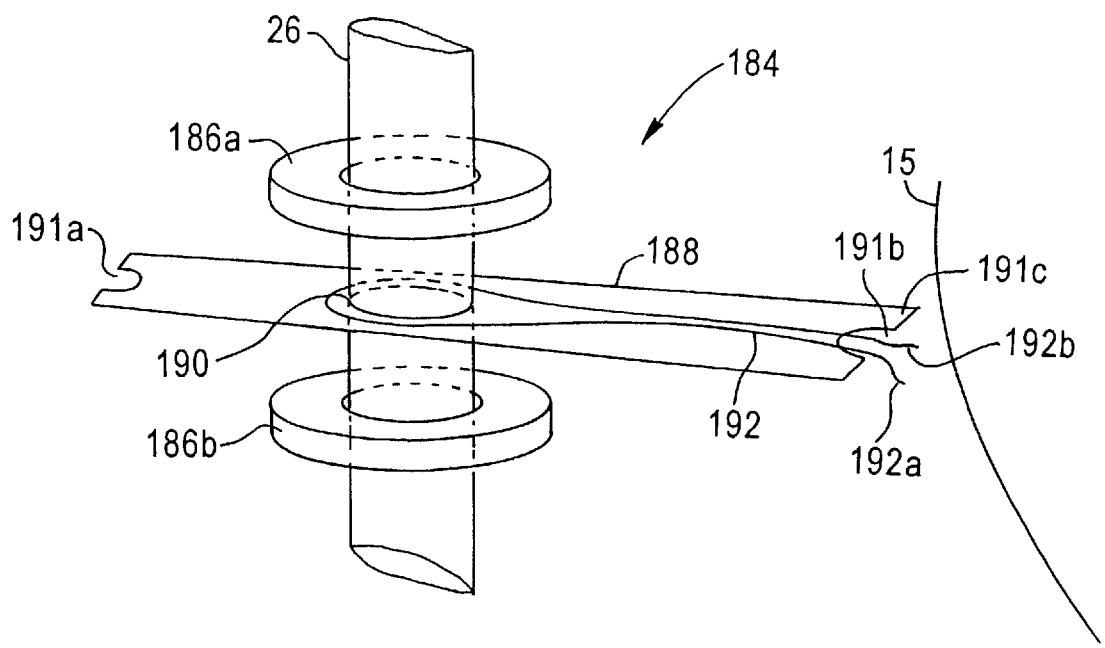
FIG. 6 is a perspective view of an embodiment of an alignment spacer in accordance with the present invention for use with the draft measurement device of FIG. 1.

With reference to FIG. 6, draft measurement device 12 advantageously includes an alignment spacer assembly, generally designated by reference numeral 184, which orients tube 26 vertically when tube 26 is positioned adjacent hull 15 of vessel 14. Spacer 184 includes a pair of vertically spaced, disc-shaped floats 186a and 186b, each of which surrounds a portion of outer wall 37 of tube 26. Each of discs 186a, 186b includes a central, vertically directed through-aperture having a diameter sized to receiving the outer surface of tube 26. A flat, elongate stiff spacer 188, loosely retained between discs 186a, 186b, includes an aperture 190 sized to receive the outer surface of tube 26. A pair of bevels or recesses 191a and 191b are respectively formed at opposing ends of metal strip 188. Spacer 184 includes an end 191c proximate hull 15. A fastener 192, such as a length of rope, includes a middle portion looped around a length of tube 26 between discs 186a, 186b. Fastener 192 extends adjacent a portion of metal strip 188 and includes end portions 192a and 192b which can be fixed to any convenient anchor point attached to hull 15.

Still with reference to FIG. 6, to align tube 26 with the vessel draft using spacer 184, the user places tube 26 into the vertically operative position adjacent hull 15. The user grasps the top end of tube 26 and moves the same so that end 191c of spacer 188 contacts hull 15.

Figure 7:
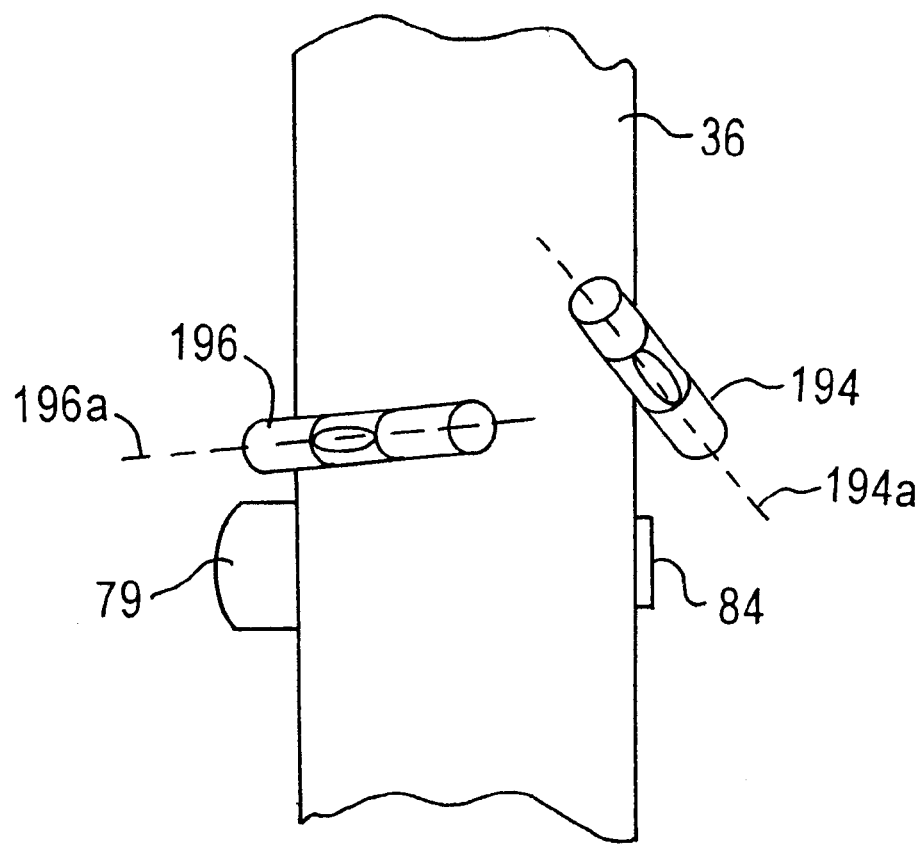
FIG. 7 is perspective view of an bubble level arrangement in accordance with the present invention for use with the draft measurement apparatus.

With reference to FIG. 7, draft measurement device 12 advantageously includes a first horizontally extending bubble level 194 and a second horizontally extending bubble level 196 used instead of or in combination with spacer assembly 184, to properly orient tube 26 with the draft of vessel 14. Bubble levels 194,196, of well known construction, are fixed to an external surface of upper housing 36 of draft measurement device 12 to enable the user of draft measurement device 12 to view the bubble levels from the top end of the measurement device. Bubble levels 194,196 are circumferentially spaced from each other such that their respective axes 194a,196b are perpendicular to each other. In operation, the bubble levels indicate displacement of tube 26 away from the vertical direction so that the user of draft measurement device 12 can keep tube 26 vertical while taking draft readings.

Method of use

Having described draft measurement device 12 in detail, the method of using the device to measure the draft of a vessel will now be described. Initially, device 12 is configured with an empty interior volume 32, with actuator rod 42 in the first position, and with valve 40 in the corresponding closed position. Referring again to FIG. 1, a user positions draft measurement device 12 adjacent hull 15 of vessel 14 with lower end 30 of tube 26 immersed in fluid 18 in which vessel 14 is floating, and with the top end of tube 26 transversely aligned with calibrated marker 22 on hull 15. As previously mentioned, calibrated marker 22 indicates the known draft 23 of vessel 14. The user properly orients device 12 using spacer assembly 184 and/or bubble levels 194,196, in order to maintain substantially parallel alignment between tube 26 and draft 20 in the presence of wave action at water surface 17. It should be appreciated that, even with the alignment devices previously described, small deviations in the parallel alignment between tube 26 and draft 20 result from the wave action at surface 17 and underwater currents tending to cause relative motion between tube 26 and hull 15.

With draft measurement device 12 positioned as just described, the user depresses plunger 52 in the direction of arrow DV to lock actuator rod 42 into the second position and to correspondingly lock valve 40 in the open position, as depicted in FIGS. 1 and 2B, to thus establish within interior volume 32 a level of water indicative of draft 20. With valve 40 in the open position, water rises within interior volume 32 up to an average water level 182 representative of 1) an average water level of water surface 17 surrounding tube 26, and 2) water-line 19 on hull 15.

With water level 182 stabilized within interior volume 32, the user places valve 40 into the closed position to thereby retain or preserve water level 182 within interior volume 32. The user closes valve 40 by depressing end cap 79 of lock mechanism 39 in transverse direction L, as described above. With valve 40 biased closed, the user removes draft measurement device 12 from body of water 18 and transports draft measurement device 12 to a location where water level 182 can be conveniently, safely, and carefully observed as against measurement indicia 34, to determine distance 24 between the top-end of tube 26 and water level 182. As previously mentioned, the known or calibrated draft 23 less distance 24 represents draft 20 of vessel 14.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A portable draft measurement device for measuring the draft of a vessel having a lower portion immersed in a fluid, comprising:
    a tube having an upper end, a lower end, an interior volume, and indicia to indicate a level of fluid retained within said interior volume;
    a valve fixed to said lower end of said tube, said valve having an open position placing said interior volume into fluid communication with the fluid when said lower end is immersed therein to create the level of fluid within said interior volume and having a sealed closed position to thereby retain the level of fluid within said interior volume;
    an actuator coupled to said upper end of said tube for placing said valve into said open and closed positions, said actuator including a first resilient member biasing said actuator into a first position corresponding to said closed position of said valve, said actuator being displaceable from said first position to a second position against a bias of said first resilient member to place said valve into said open position,
    wherein said actuator includes an elongate actuator rod extending through said interior volume of said tube in a longitudinal direction substantially parallel with an axis of said tube, said actuator rod having a lower end coupled to said valve and an upper end positioned proximate said upper end of said tube and engaging said first resilient member, said actuator rod being displaceable in said longitudinal direction between said first and second positions, wherein said valve includes:
        a valve body positioned within said tube and fixed to an inner peripheral surface of said tube, said valve body including a through-aperture, and
        a displaceable plug coupled with said lower end of said actuator rod, said plug including a sealing surface aligned with and sized to completely block said through-aperture of said valve body, said sealing surface being separated from said valve body when said valve is in said open position to thereby place said through-aperture of said valve body and said interior volume in fluid communication with the fluid, said sealing surface engaging said valve body and forming a watertight seal with said valve body to seal said through-aperture when said valve is in said closed position.

2. The device of claim 1, further comprising a lock mechanism fixed to said upper end of said tube for locking said actuator into said second position corresponding to said open position of said valve, said lock mechanism including a resiliently biased locking-pin displaceable within said housing, said locking-pin being biased into locking engagement with said actuator rod when said actuator rod in said second position.

3. The device of claim 1, wherein said tube is transparent along a length of said tube coinciding with said indicia to permit visual observation of said indicia and the level of fluid through said tube.

4. The device of claim 1, wherein the level of fluid created within said tube when said valve is in said open position tends to fluctuate responsive to fluidic pressure, and wherein said device further includes at least one fluidic baffle fixed to said lower end of said tube proximate said valve to dampen the fluctuations of the level of fluid.

5. The device of claim 4, wherein said at least one fluidic baffle includes an interior-baffle fixed within said interior volume and an exterior-baffle coupled with an exterior portion of said tube.

6. The device of claim 1, further including means for orienting said tube parallel with the draft of the vessel, said means being selected from the group consisting of:
    1) spacer means including an elongate rigid spacer having a through-aperture for receiving a length of said tube and an end for contacting a hull of the vessel, and
    2) first and second bubble level means fixed to an exterior portion of said tube upper end of indicating displacement of said tube away from a vertical direction.

7. The device of claim 1, further including an actuator guide fixed to an inner periphery of said tube proximate said upper end of said tube, said actuator guide including a through-aperture, said actuator rod including an upper-portion extending through said through-aperture and beyond an upper surface of said actuator guide.

8. The device of claim 7, wherein said first resilient member is compressively retained between said upper surface of said actuator guide and said upper end of said actuator rod to bias said actuator rod into said first position.

9. The device of claim 8, further including a lock mechanism retained substantially within said tube for locking said valve into said open position, said lock mechanism including a housing fixed to said tube proximate said upper end of said tube, said lock mechanism including a resiliently biased locking-pin displaceable within said housing between:

1) a locked position wherein said locking-pin engages a recess of said actuator rod positioned proximate said lock mechanism to thereby maintaining said actuator rod in said second position, and 2) an unlocked position wherein said actuator rod is disengaged from said recess of said actuator rod to thereby permit a longitudinal displacement of said actuator rod from said second position to said first position.

10. The device of claim 9, wherein said tube is substantially transparent along a longitudinal length thereof coinciding with said indicia to permit visual observation of said indicia through said tube, said tube being made from a transparent polycarbonate plastic composition.

11. The device of claim 9, wherein said lock mechanism further includes a second resilient member retained between said lock housing and said locking-pin to bias said locking-pin against said actuator rod and into said locked position of said locking-pin, said locking-pin being displaceable in a transverse direction substantially perpendicular to the axis of said tube.

12. The device of claim 11, wherein said upper end of said tube terminates in a peripheral edge defining an opening in communication with said interior volume of said tube, said upper end of said actuator rod being accessible through said opening.

13. The device of claim 12, wherein said indicia extends longitudinally within said interior volume and includes linear graduations in units of length beginning with a lowest value at said peripheral edge of said upper end of said tube and increasing linearly toward said lower edge of said tube, so as to indicate a longitudinal distance between said peripheral edge and a level of fluid within said interior volume of said tube.

14. A portable draft measurement device for measuring the draft of a vessel having a lower portion immersed in a fluid, comprising:

a tube having an upper end, a lower end, an interior volume, and indicia to indicate a level of fluid retained within said interior volume;

a valve fixed to said lower end of said tube, said valve having an open position placing said interior volume into fluid communication with the fluid when said lower end is immersed therein to create the level of fluid within said interior volume and having a sealed closed position to thereby retain the level of fluid within said interior volume;

an actuator coupled to said upper end of said tube for placing said valve into said open and closed positions, said actuator including a first resilient member biasing said actuator into a first position corresponding to said closed position of said valve, said actuator being displaceable from said first position to a second position against a bias of said first resilient member to place said valve into said open position, wherein said actuator includes an elongate actuator rod extending through said interior volume of said tube in a longitudinal direction substantially parallel with an axis of said tube, said actuator rod having a lower end coupled to said valve and an upper end positioned proximate said upper end of said tube and engaging said first resilient member, said actuator rod being displaceable in said longitudinal direction between said first and second positions, wherein said valve includes:

a valve body positioned within said tube and fixed to an inner peripheral surface of said tube, said valve body including a through-aperture, and a displaceable plug coupled with said lower end of said actuator rod, said plug including a sealing surface aligned with and sized to completely block said through-aperture of said valve body, said sealing surface being separated from said valve body when said valve is in said open position to thereby place said through-aperture of said valve body and said interior volume in fluid communication with the fluid, said sealing surface engaging said valve body and forming a watertight seal with said valve body to seal said through-aperture when said valve is in said closed position, wherein the level of fluid created within said tube when said valve is in said open position tends to fluctuate responsive to fluidic pressure, and wherein said device further includes at least one fluidic baffle fixed to said lower end of said tube proximate said valve to dampen the fluctuations of the level of fluid.

* * * * *